United States Patent
Scholten et al.

(10) Patent No.: US 6,784,135 B2
(45) Date of Patent: Aug. 31, 2004

(54) THERMAL REGULATING CATALYST COMPOSITION

(75) Inventors: Anton Scholten, Apeldoorn (NL); Peter F. M. T. Van Nisselrooy, Nijmegen (NL); Walter R. De Jongh, Deventer (NL); Jan Stokman, Enschede (NL)

(73) Assignee: Power Plug, Inc., DE (US)

( * ) Notice: Subject to any disclaimer, the term of this patent is extended or adjusted under 35 U.S.C. 154(b) by 0 days.

(21) Appl. No.: 10/348,460

(22) Filed: Jan. 21, 2003

(65) Prior Publication Data

US 2003/0144133 A1 Jul. 31, 2003

Related U.S. Application Data

(63) Continuation of application No. 09/676,841, filed on Sep. 29, 2000.

(30) Foreign Application Priority Data

Nov. 3, 1999 (NL) ............................................. 1013478

(51) Int. Cl.$^7$ ........................... B01J 21/08; B01J 21/12; B01J 21/14; B01J 23/40; B01J 23/42

(52) U.S. Cl. ........................... 502/245; 502/74; 502/84; 502/244; 502/253; 502/258; 502/259; 502/260; 502/261; 502/262; 502/326; 502/327; 502/329; 502/331; 502/332; 502/333; 502/334; 502/335; 502/336; 502/337; 502/338; 502/339; 502/340; 502/341; 502/342; 502/343; 502/344; 502/345; 502/346

(58) Field of Search .................................. 429/220, 221, 429/223, 231, 230, 231.3, 231.5; 502/74, 84, 244, 245, 253, 258–262, 326, 327, 329, 331–339, 340–346, 241, 256, 307, 318–320, 323

(56) References Cited

U.S. PATENT DOCUMENTS

| | | | |
|---|---|---|---|
| 3,894,102 A | | 7/1975 | Chang et al. |
| 4,138,442 A | * | 2/1979 | Chang et al. ............... 518/702 |
| 4,448,998 A | | 5/1984 | King |
| 4,472,535 A | * | 9/1984 | Chang et al. ............... 518/714 |
| 4,483,691 A | | 11/1984 | McShea, III et al. |
| 4,582,585 A | * | 4/1986 | Ray ........................ 204/243 R |
| 4,599,454 A | * | 7/1986 | Elliott et al. ............... 568/387 |
| 4,605,775 A | * | 8/1986 | Elliott ........................ 568/387 |

(List continued on next page.)

FOREIGN PATENT DOCUMENTS

WO    WO 01/37990 A1    5/2001

*Primary Examiner*—Cam N. Nguyen
(74) *Attorney, Agent, or Firm*—Fish & Richardson P.C.

(57) ABSTRACT

A composition is provided that can be used, for example, in a fuel processor for a fuel cell system. The composition includes a first material such as a catalyst, and a second material such as a desiccant. The second material is capable of sorbing and desorbing a heat transfer material such as water, and is present in an amount sufficient to sorb an amount of the heat transfer material sufficient to remove a portion of the heat generated when the first material undergoes an exothermic reaction.

21 Claims, 6 Drawing Sheets

U.S. PATENT DOCUMENTS

| | | | |
|---|---|---|---|
| 4,678,760 A | 7/1987 | Ray | |
| 4,808,562 A | 2/1989 | Kubersky et al. | |
| 4,844,837 A | 7/1989 | Heck et al. | |
| 4,923,836 A | 5/1990 | Kokayeff et al. | |
| 4,927,857 A | 5/1990 | McShea, III et al. | |
| 4,939,292 A * | 7/1990 | Elliott et al. | 560/239 |
| 5,023,276 A | 6/1991 | Yarrington et al. | |
| 5,218,003 A | 6/1993 | Lewnard et al. | |
| 5,254,516 A | 10/1993 | Gupta et al. | |
| 5,459,166 A | 10/1995 | Lee et al. | |
| 5,478,789 A | 12/1995 | Hattori et al. | |
| 5,554,215 A | 9/1996 | Simpson et al. | |
| 5,563,106 A * | 10/1996 | Binner et al. | 501/84 |
| 5,783,515 A | 7/1998 | Sakurai et al. | |
| 5,834,395 A | 11/1998 | Honda | |
| 5,905,051 A | 5/1999 | Wu et al. | |
| 6,147,125 A | 11/2000 | Shikada et al. | |
| 6,156,084 A * | 12/2000 | Bonville, Jr. et al. | 48/61 |
| 6,162,267 A * | 12/2000 | Priegnitz et al. | 48/199 FM |
| 6,245,303 B1 | 6/2001 | Bentley et al. | |
| 6,254,807 B1 | 7/2001 | Schmidt et al. | |
| 6,375,924 B1 * | 4/2002 | Towler et al. | 423/656 |
| 6,409,974 B1 * | 6/2002 | Towler et al. | 422/172 |

* cited by examiner

THERMAL REGULATING CATALYST COMPOSITION

CROSS-REFERENCE TO RELATED APPLICATIONS

This application is a continuation claim priority under 35 USC §120 to U.S. patent application Ser. No. 09/676,841, filed Sep. 29, 2000, and entitled "Thermal Regulating Catalyst Composition," which claims priority under 35 USC §119 to Dutch Patent Application No. 1013478, filed on Nov. 3, 1999, and entitled "Fuel Processor for the Production of Hydrogen and a Device, Which is Suitable for Use in Such a Processor, for Generating a Third and Fourth Gas Stream from a First and Second Gas Stream", the entire contents of which are hereby incorporated by reference.

BACKGROUND

The invention relates to a thermal regulating composition that can be used, for example, as a catalyst system in a fuel processor for a fuel cell system.

Fuel cells are an increasingly popular power generation technology, where chemical reactions are utilized to produce electricity. The reactants are typically hydrogen and oxygen. Along with the electricity generated, the sole reaction product is water. Hydrogen for such fuel cells may be supplied by chemically converting a fuel such as natural gas, propane, gasoline, diesel, methanol, etc., into a hydrogen-rich stream. This process is typically referred to as fuel processing, and the hydrogen-rich stream is typically referred to as reformate.

The catalyst systems used in fuel processors generally include a dispersion of small catalyst particles on a support material. It is generally desirable to minimize the size of the catalyst particles that are used in order to maximize the surface area of catalyst that is provided to promote a given reaction. However, small metal particles, such as those typically used as catalysts, may tend to be pyrophoric, meaning that they will spontaneously and rapidly oxidize when exposed to oxygen or air. Oxidation is exothermic, meaning that the reaction releases heat energy. Pyrophoricity tends to increase as smaller particles are used, and some metals (e.g., non-precious metals such as iron and copper) may tend to be more pyrophoric than others. In some cases, the heat generated by this oxidation may pose a fire or other safety hazard, or may damage the catalyst configuration itself.

Catalysts subject to such concerns are typically pre-reacted with oxygen in a controlled environment before they are handled. For example, a catalyst may be oxidized slowly in a dilute oxygen atmosphere to avoid overheating, and may then be shipped in a relatively non-reactive oxidized state (referred to as the oxidized state). Since catalysts in an oxidized state generally have diminished catalytic effectiveness or no effectiveness at all, they are typically reduced or activated before they can be used (referred to as the reduced, or active state). This generally involves flowing hydrogen or another reducing agent across the catalyst at an elevated temperature (e.g., over 200° C.), in order to react away the oxidation layer. This reduction (activation) step is also exothermic, and may need to be controlled (e.g., by using diluted hydrogen) to avoid overheating.

One reason why catalyst overheating can be a problem, and thus why catalyst temperature control is important, is because some catalysts will lose their catalytic effectiveness if they are overheated. For example, when copper-based catalyst particles are heated to over 400° C., the particles may tend to sinter (also referred to as densification), meaning that small particles will tend to combine into larger particles. Thus, this temperature may be referred to as the sintering temperature of this material. Such sintering can reduce the surface area of the catalyst, thereby reducing its effectiveness. As known in the art, other catalyst materials are subject to similar concerns at other sintering temperatures.

SUMMARY

The invention relates to a thermal regulating composition that can be used, for example, as a catalyst system in a fuel processor for a fuel cell system.

In general, in one aspect, the invention provides a composition including a first material capable of catalyzing or undergoing an exothermic chemical reaction, and a second material capable of sorbing and desorbing a heat transfer material. The second material is present in an amount sufficient to sorb an amount of the heat transfer material sufficient to remove heat from the first material when heat from the exothermic reaction causes the heat transfer material to desorb from the second material. The first material and the second material may form a mixture.

In certain embodiments, the second material can be a desiccant, such as a zeolite, silicon oxide, aluminum oxide, or a clay. In such embodiments, the heat transfer material is water. The first material can be a fuel processor catalyst, such as a material or compound including copper, nickel, iron, chromium, zinc, cobalt, platinum, palladium, rhodium, ruthenium, or iridium. Fuel processor catalysts can be classified, for example, as catalytic partial oxidation catalysts, high temperature water-gas shift catalysts (also generally referred to as the shift reaction), low temperature water-gas shift catalysts (also generally referred to as the shift reaction), and preferential oxidation catalysts.

An advantage is that this configuration reduces the pyrophoricity of the composition such that in some embodiments the composition can be exposed to air without hazard to safety or damage to the catalyst configuration. The finely-divided catalyst material, consequently, can have a high surface area and oxidize, for example, when air accidentally enters into the reformer, without damage to the catalyst. Thus, in some embodiments, the invention provides a catalyst material that is easier and safer to handle, and can be oxidized (as for shipping) or activated more easily, safely and conveniently than catalyst systems not of the invention. Another advantage is that this temperature quenching capability of the composition allows superior temperature control of the composition during reaction. For example, compositions under the invention are less prone to rapid temperature excursions from runaway reactions than compositions not of the invention. The temperature of compositions under the invention have improved controllability through heat exchange methods and reactant control (such as cutting off or reducing reactants), as examples.

In general, some embodiments of the invention provide a catalyst that includes a sufficient amount of a desiccant to sorb and desorb water to substantially quench the temperature of the catalyst when the catalyst is exposed to an exothermic reaction. Under normal operating conditions, the desiccant sorbs water from the reformate stream. However, when the catalyst is exposed to an exothermic oxidizing or reducing condition, the heat generated causes the water in the desiccant to desorb as vapor into the reformate, thereby cooling the catalyst and making the system more temperature controllable. The desorbed, vaporized water also permeates throughout the catalyst tending to further cool the catalyst. As an example, some desiccants, such as zeolites, can desorb up to about 50–100 L of steam per one liter of desiccant. Thus, the risk of the catalyst overheating and/or igniting is minimized with the desorption/evaporative cooling capacity of this water, thereby lessening the risk of damage to the catalyst material and other components in the reformer.

The water sorption by the desiccant may also temporarily enhance the performance of the catalyst by allowing the desiccant to supply more water to the catalyst material. More water generally enhances the water-gas shift reaction by shifting the reaction to an equilibrium favoring the production of hydrogen and carbon dioxide, thereby producing more hydrogen while reducing CO.

In certain embodiments, the first material (generally the catalyst) and the second material (generally the desiccant) are present in a range of weight ratios from about 1:1 to about 1:10, respectively. In other embodiments, a narrower range may be desired, such as from about 1:1 to about 1:5. The first and second materials may also be present in approximately equal amounts. In yet other embodiments, it may be desired to have more of the first material than second material, or to have even more of the second material present than described above, such as a ratio of over 1:10.

In certain embodiments, the first and second materials are formed into granules. The granules may have spherical, cylindrical, or other shapes. The granules can also be pellets and agglomerated particles. The first and second materials may also be coated onto a support structure, such as a ceramic monolith. In some embodiments, the first material may be coated onto the second material. In other embodiments, the first material may be disposed on a third material. The third material may include, as examples, an aluminum oxide, zinc oxide, zirconium oxide, or an iron oxide. As examples, it may be desired to have the first material disposed on the third material with a load between about 5% and about 30% by weight, or a load between about 10% and about 20% by weight. It may also be desired for the first and third materials to form a catalytic composite containing less than about 20% by weight of the third material, such as about 5% to about 15% by weight of the third material.

In still other embodiments, it may be desired for the catalytic composite to contain a fourth material such as zinc oxide, zirconium oxide, and iron oxide. It may be desired for the catalytic composite comprises less than about 50% by weight of the fourth material, such as between about 20% and about 30% by weight of the fourth material. The composition can also include a fifth material capable of sorbing hydrogen and forming hydrogen atoms, such as platinum, nickel, palladium, rhodium, or ruthenium.

In general, in another aspect, the first material can have a reduced state and an oxidized state, and the second material can be present in an amount sufficient to prevent the composition from sintering when the first material is in the reduced state and is exposed to air. The second material can also be present in an amount sufficient to prevent the composition from reaching a sintering temperature of the first material when the first material has a starting temperature of less than 100° C. and is in the reduced state and is exposed to a flow of 4 liters per minute of air. The second material can also be present in an amount sufficient to prevent the composition from reaching a sintering temperature of the first material when the first material has a starting temperature of less than 100° C. and is in the oxidized state and is exposed to a flow of 100 standard liters per minute of hydrogen.

In general, in another aspect, the invention can include a fuel processor for a fuel system that includes a catalyst composite containing a first material capable of catalyzing an exothermic reaction and a second material capable of sorbing and desorbing water. The catalyst composite can be disposed within the fuel processor. In some embodiments, the fuel processor can be devoid of a high-temperature shift catalyst.

In general, in another aspect, the invention provides a low temperature water-gas shift reaction catalyst that can have one or more of the following features: it can be present in granules (such as pellets); it can include a copper based catalyst; it can include a zinc based catalyst or component; and it can include a desiccant material such as a zeolite in a weight percent equal to or greater than a combined first and second amounts of CuO and ZnO. As previously discussed, the granules can be present in multiple shapes and sizes. In general, a granule's largest cross-sectional dimension is referred to as a cross-sectional dimension. For example, this would refer to the diameter of a spherical granule, or to the larger of the length and diameter of a cylindrical granule. In certain embodiments, the granules can have a cross-sectional dimension of about ⅛ inch (this dimension can be larger as desired), and the desiccant can be present in an amount such that when about 20 kg of the granules are at a temperature less than 100° C., and are exposed to a water-saturated flow of 100 standard liters per minute of hydrogen at a temperature less than 300° C., the granules are limited to a temperature below about 400° C. as the granules are subject to reduction from the hydrogen. In some embodiments the desiccant can be present in an amount such that when about 20 kg of the granules are saturated with water at a temperature less than 100° C., and are exposed to a dry flow of 100 standard liters per minute of hydrogen at a temperature less than 300° C., the granules are limited to a temperature below about 400° C. as the granules are subject to reduction from the hydrogen. In some embodiments, the desiccant can contain water and be present in an amount such that the granules are limited to a temperature below about 400° C. as the granules are exposed to air. In some embodiments, this exposure to air can include an air flow of about 4 liters per minute.

Many other embodiments are possible. Other features, objects, and advantages of the invention will be apparent from the description and drawings, and from the claims. All percents and ratios described are by weight.

DETAILED DESCRIPTION OF THE PREFERRED EMBODIMENT

The invention relates to a thermal regulating composition that can be used, for example, as a catalyst system in a fuel processor for a fuel cell system. In the context of the invention, the term composite refers to a mixture containing more than one material, and the term catalyst refers to a catalytically active species, whether alone or present in a composite. For example, a catalyst can be platinum or platinum supported on alumina.

Figure 1:
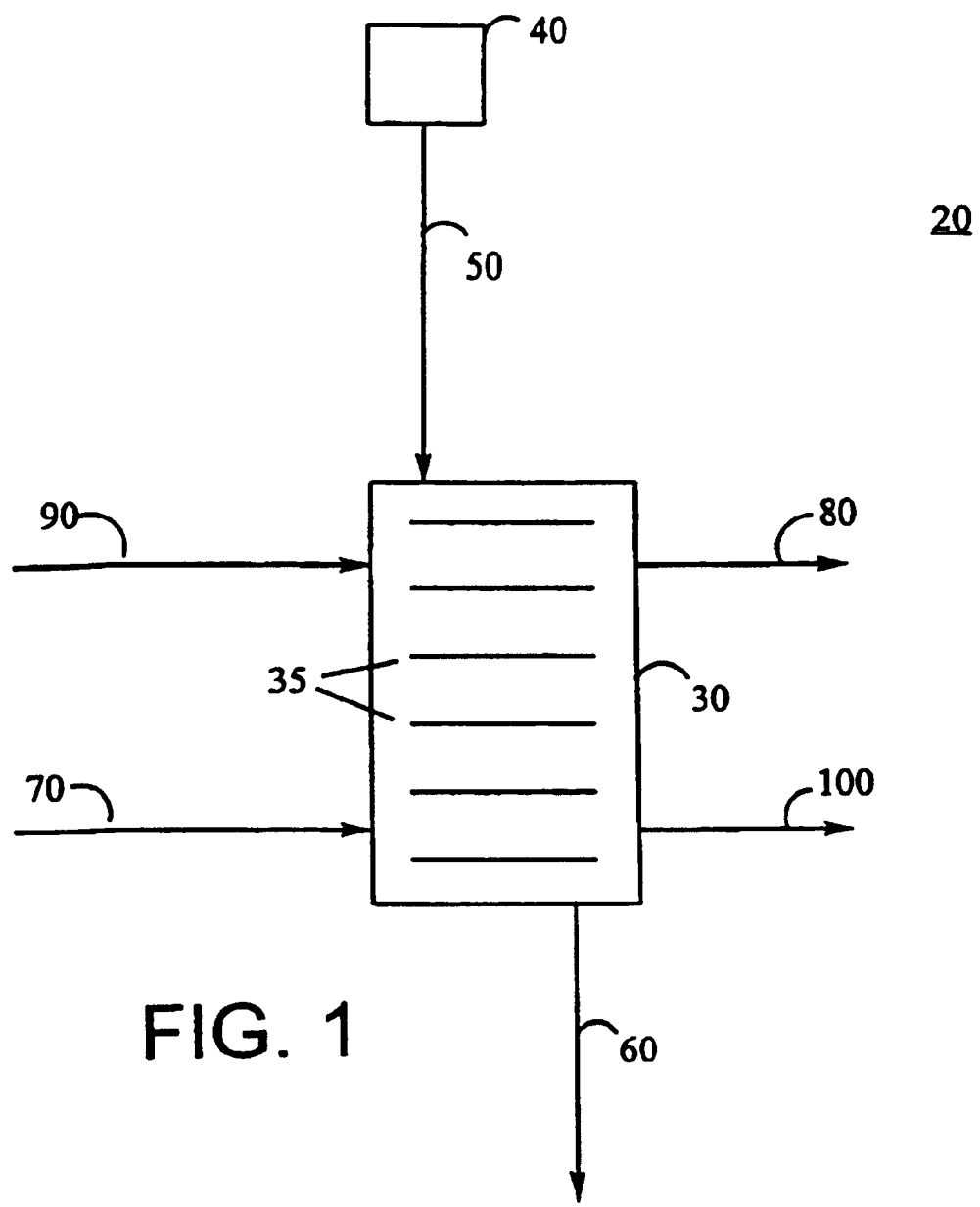
FIG. 1 is a schematic diagram of an embodiment of a fuel cell system.

FIG. 1 shows a fuel cell system 20 including a fuel cell stack 30 having a plurality of fuel cells 35, an anode gas supply 40, an anode gas inlet line 50, an anode gas outlet line 60, a cathode gas inlet line 70, a cathode gas outlet line 80, a coolant inlet line 90, and a coolant outlet line 100. Anode gas supply 40, e.g., a fuel processor or a reformer, generally supplies anode gas to fuel cell stack 30 to be oxidized. The anode gas supply 40 can be a fuel processor. The anode gas contains hydrogen flowing to the anode side of the fuel cell, and the cathode gas contains oxygen (air) flowing to the cathode side of the fuel cell. At the anode, the hydrogen undergoes oxidation as the diatomic hydrogen molecules are divided and stripped of their electrons by the anode catalyst. The hydrogen ions flow through the fuel cell membrane and react with the oxygen at the cathode side of the fuel cell to form water. Heat generated from this reaction is removed by a circulated coolant. The electrons stripped from the hydrogen molecules at the anode provide an electric potential across the fuel cell that can produce an electric current when coupled to a load. The specific reactions that occur in the fuel cell are represented in equations (1)–(3).

$$H_2 \rightarrow 2H^+ + 2e^- \quad (1)$$

$$\tfrac{1}{2}O_2 + 2H^+ + 2e^- \rightarrow H_2O \quad (2)$$

$$H_2 + \tfrac{1}{2}O_2 \rightarrow H_2O \quad (3)$$

The electric potential provided by a fuel cell is theoretically set by the electrochemical potential of the reaction conducted in the cell, but may be somewhat less depending on factors such as the reaction conditions, physical properties of the membrane, and the conductivity of the cell. For example, a typical PEM fuel cell may provide a potential in a range from about 0.5 to 1 volt. The amount of current produced depends on the amount of fuel reacted. To achieve a system with higher voltage, a plurality of fuel cells can be arranged in series to form what is referred to as a fuel cell stack.

Where pure reactants are not readily available or economical to supply to a fuel cell, it may be desirable to use air as an oxygen source, and to use a fuel processor to convert a hydrocarbon such as methane or methanol into a hydrogen rich stream. The two reactions which are generally used to achieve this fuel conversion as shown in equations (4) and (5).

$$\tfrac{1}{2}O_2 + CH_4 \rightarrow 2H_2 + CO \quad (4)$$

$$H_2O + CH_4 \rightarrow 3H_2 + CO \quad (5)$$

The reaction shown in equation (4) is sometimes referred to as catalytic partial oxidation (CPO). The reaction shown in equation (5) is generally referred to as steam reforming. Both reactions may be conducted at a temperature from about 600–1,100° C. in the presence of a catalyst such as nickel with amounts of a noble metal, such as cobalt, platinum, palladium, rhodium, ruthenium, iridium, and a support such as magnesia, magnesium aluminate, alumina, silica, zirconia, by themselves or in combination. Alternatively, reforming catalysts can also be a single metal, such as nickel or platinum, supported on a refractory carrier like magnesia, magnesium aluminate, alumina, silica, or zirconia, by themselves or in combination, or promoted by an alkali metal like potassium. Other catalysts and reaction conditions may also be used.

A fuel processor may use either of these reactions separately, or both in combination. While the CPO reaction is exothermic, the steam reforming reaction is endothermic. Reactors utilizing both reactions to maintain a relative heat balance are sometimes referred to as autothermal (ATR) reactors (note that the terms CPO and ATR are sometimes used interchangeably). Also, it should be noted that fuel processors are sometimes generically referred to as reformers, and the fuel processor output gas is sometimes generically referred to as reformate, without respect to which reaction is employed.

As evident from equations (4) and (5), both reactions produce carbon monoxide (CO). Such CO is generally present in amounts greater than 10,000 ppm. Because of the high temperature at which the fuel processor is operated, this CO generally does not affect the catalysts in the fuel processor. However, if this reformate is passed to a fuel cell system operating at a lower temperature (e.g., less than 100° C.), the CO may poison the catalysts in the fuel cell by binding to catalyst sites, inhibiting the hydrogen in the cell from reacting. In such systems it is typically desirable to reduce CO levels to less than 100 ppm. For this reason the fuel processor may employ additional reactions and processes to reduce the CO that is produced. For example, two additional reactions that may be used to accomplish this objective are shown in equations (6) and (7). The reaction shown in equation (6) is generally referred to as the shift reaction, and the reaction shown in equation (7) is generally referred to as preferential oxidation (PROX).

$$CO + H_2O \rightarrow H_2 + CO_2 \quad (6)$$

$$CO + \tfrac{1}{2}O_2 \rightarrow CO_2 \quad (7)$$

Various catalysts and operating conditions are known for accomplishing the shift reaction. For example, the reaction may be conducted at a temperature from about 300–600° C. in the presence of various catalysts including ferric oxide, chromic and chromium oxides, iron silicide, supported platinum, supported palladium, and other supported platinum group metals, by themselves or in combination. Other catalysts and operating conditions are also known. Such systems operating in this temperature range are typically referred to as high temperature shift (HTS) systems.

The shift reaction may also be conducted at lower temperatures such as 100–300° C. in the presence of other catalysts such as copper supported on transition metal oxides like zirconia, zinc supported on transition metal oxides or refractory supports like silica or alumina, supported platinum, supported rhenium, supported palladium, supported rhodium and supported gold, by themselves or in combination. Combinations of copper with cerum or rare earth metals or ceria or rare earth metal oxides are also known to exhibit high catalytic activity. Such systems operating in this temperature range are typically referred to as low temperature shift (LTS) systems. Other catalysts and operating conditions are also known. In a practical sense, typically the shift reaction may be used to lower CO levels to about 3,000–10,000 ppm, although as an equilibrium reaction it may be theoretically possible to drive CO levels even lower.

The PROX reaction may also be used. The PROX reaction is generally conducted at lower temperatures than the shift reaction, such as 100–200° C. Like the CPO reaction, the PROX reaction can also be conducted in the presence of an oxidation catalyst such as platinum. The PROX reaction can typically achieve CO levels less than 100 ppm. Other non-catalytic CO reduction and reformate purification methods are also known, such as membrane filtration and pressure swing adsorption systems.

As previously discussed, catalyst beds, such as those used to accomplish the reactions described above, generally comprise a dispersion of small catalyst particles on a support material. It is generally desirable to minimize the size of the catalyst particles that are used in order to maximize the surface area of catalyst that is provided to promote a given reaction. For example, it may be desirable to use catalyst particles having a size from 3 to 700 nm. However, small metal particles, such as those typically used as catalysts, may tend to be pyrophoric, meaning that they can spontaneously and rapidly oxidize when exposed to oxygen or air. Pyrophoricity tends to increase as smaller particles are used, and some metals (e.g., non-precious metals such as iron and copper) may tend to be more pyrophoric than others. In some cases, the heat generated by this oxidation may pose a fire or other safety hazard, or may damage the catalyst configuration itself, for example through sintering effects.

Since catalysts in an oxidized state may generally have diminished effectiveness or no effectiveness at all, such catalysts are typically reduced or activated before they can be used. This generally involves flowing hydrogen or another reducing agent across the catalyst at an elevated temperature (e.g., over 100° C.), in order to react away the oxidation layer. This reducing step is typically exothermic, so that the rate of reduction may need to be controlled to avoid damaging the catalyst configuration. For example, in the case of a copper oxide catalyst system, rapid reduction by a hydrogen stream at about 300° C. can result in temperatures well over 300° C. (e.g., 400–1,000° C.) being generated at the reduction reaction sites. At such temperatures, the surface area of the catalyst system can be reduced through sintering effects, and the effectiveness of the catalyst can be reduced accordingly.

Figure 2:
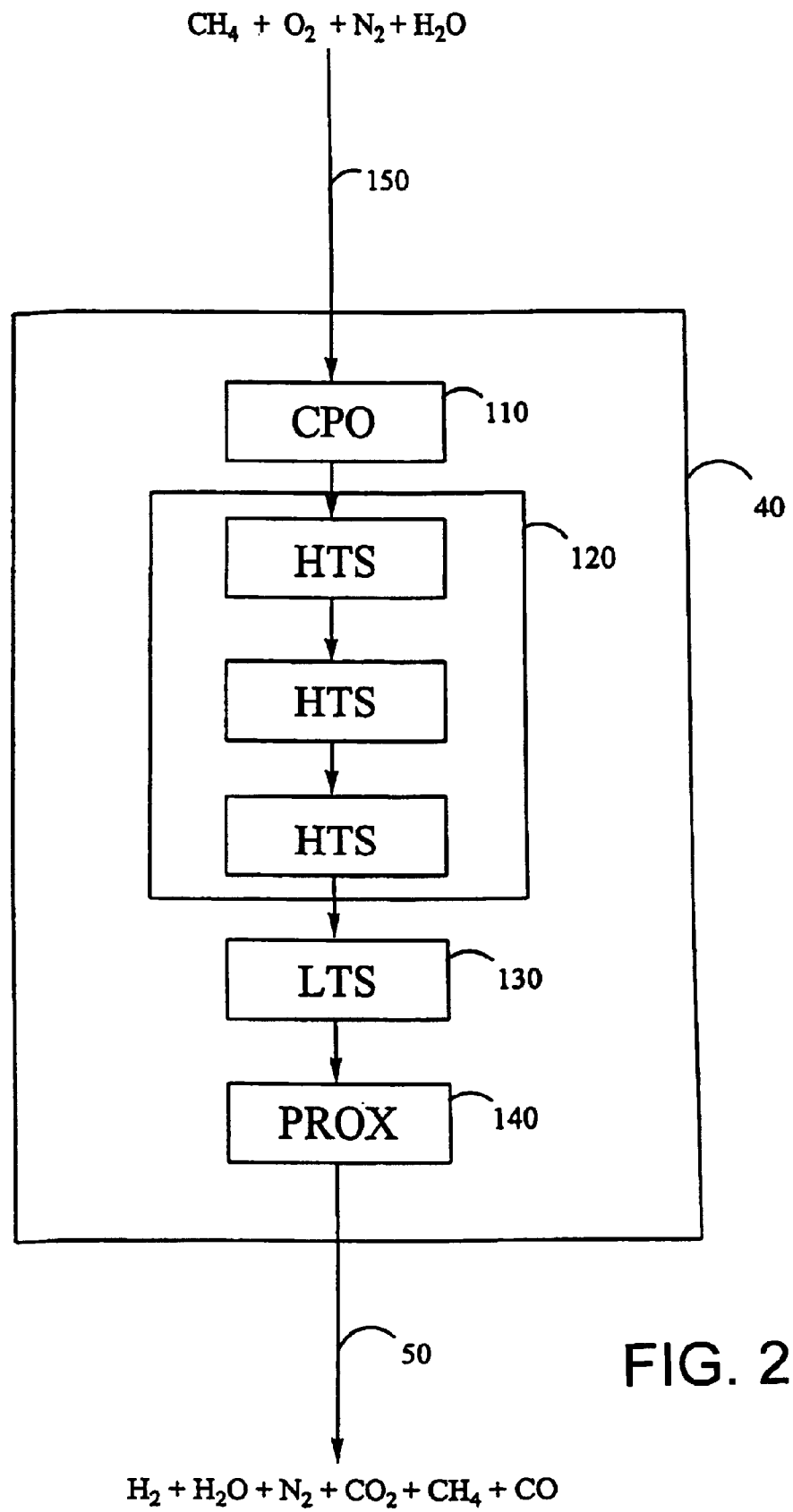
FIG. 2 is a schematic diagram of an embodiment of a fuel processor.

FIG. 2 shows an embodiment of anode gas supply 40 having a CPO catalyst 110, a series of HTS catalysts 120, an LTS catalyst 130, and a PROX catalyst 140. Various anode gas supplies that can be used in system 20 are known to those skilled in the art. An example of an anode gas supply is described in detail in Dutch Patent Application No. 1013478.

Generally, anode gas supply 40 reforms hydrocarbon gas, e.g., natural gas, into an anode gas, e.g., hydrogen. An anode gas stream having natural gas, e.g., $CH_4$, flows into anode gas supply 40 via natural gas inlet line 150. Typically, the natural gas in inlet line 150 has been desulfurized, mixed with air and humidified, so the anode gas stream can be a mixture of $CH_4$, $O_2$, $N_2$, and $H_2O$ at about 70–100° C. As known in the art, the amount of $H_2O$ in the stream can be selected to achieve a desired ratio with respect to the carbon (here present as methane), for example to minimize soot formation. The anode gas stream is heated to about 400° C. by a heat exchanger (not shown) and introduced to CPO 110 operating at about 600–1,000° C. As previously discussed, CPO 110, e.g., utilizes a platinum-based catalyst to convert the natural gas according to the two reactions shown above in equations (4) and (5).

After flowing through CPO 110, the anode gas stream flows through the series of HTS catalysts 120 to react carbon monoxide produced in CPO 110. The HTS catalysts, such as a platinum-based or $Fe_2O_3/Cr_2O_3$-based catalyst, minimizes the amount of carbon monoxide in the anode gas stream while producing additional hydrogen according to the shift reaction shown in equation (6).

Typically, as the anode gas stream flows through each HTS catalyst in the series of HTS catalysts 120, the temperature of the anode gas stream increases from the exothermic reaction of CO. To cool the stream, in some embodiments, the anode gas stream flows through a heat exchanger (not shown) after each HTS catalyst. The cooled anode gas stream, e.g., 100–300° C., then flows into LTS catalyst 130, which further reduces the amount of CO in the anode gas stream according to the same shift reaction as in the series of HTS catalysts 120.

LTS catalyst 130 is formed of a mixture of a catalyst material and a desiccant. The catalyst material, typically including a finely-divided catalyst material disposed on a support material, can oxidize rapidly and become flammable when exposed to an oxidizing condition. For example, a finely divided copper-based catalyst can ignite when exposed to air. Such rapid oxidation can heat the catalyst material to temperatures greater than 400° C., which can sinter the catalyst material, thereby reducing its surface area and effectiveness. Therefore, the desiccant is present in LTS catalyst 130 in an amount and containing enough water to substantially quench the temperature of the catalyst material when the catalyst material is exposed to an exothermic reaction, e.g., when air leaks into anode gas supply 40, or when the catalyst is reduced with reformate before it is used. That is, upon application of heat, e.g., when the catalyst material oxidizes rapidly, the desiccant desorbs some of the sorbed water, thereby cooling the catalyst, tending to maintain the temperature below 400° C. The catalyst material may also be limited from igniting. In general, this also allows such a system to be more temperature controllable. For example, runaway reactions may be prevented and temperature swings during oxidation, reduction, or other exothermic reactions may be slower than they would be without the inclusion of a desiccant material, allowing a fuel processor system more time for a heat exchanger (as an example) to effect a desired average temperature across the catalyst bed.

As previously discussed, temperature excursions are minimized and otherwise are more controllable when the LTS catalyst 130 is subject to a reduction reaction. For example, a fuel processor may be built with a copper-based LTS catalyst of the present invention. Since air is allowed in contact with the catalyst, it is present in an oxidized form during manufacturing and shipping of the unit. At the operating site, the catalyst must be reduced to become active. This step is simplified and improved under the present invention.

Without the desiccant material, it would be more difficult to control the temperature of the reduction reaction and to prevent the temperature from getting too high (for example, over 400° C. for the copper based catalyst material). For example, it might be necessary to reduce the catalyst with a diluted hydrogen stream (e.g., 1% $H_2$ with $N_2$ balance) to prevent a runaway reaction and temperature excursion that would damage the catalyst. Under the present invention, as previously discussed, the temperature-driven desorption of water from the desiccant material tends to cool the catalyst. Thus, a fuel processor utilizing the present invention can conduct the reduction step by simply starting operation and using reformate as the reducing stream (e.g., over 40% $H_2$ on a dry basis). In cases where the LTS temperature would still tend to rise over 300° C., as an example, there is sufficient time to allow heat exchangers to cool the catalyst bed, or to reduce the reformate flow to prevent overheating. When the fuel processor is eventually shut off, it is generally not a problem if air is allowed to enter the catalyst chamber (for example, simple exposure to air or even a flow of air through the catalyst bed such as 4 L/min), since this will not hurt the catalyst and it can be reduced again at a later time as needed.

Other embodiments are possible, including catalyst systems for other reactions in the fuel processor, other catalyst systems in general, and even more generally in non-catalytic particulate systems subject to similar issues (for example, to prevent a particulate material from igniting). The copper-based LTS catalyst embodiment is described for illustration, and because this finely divided copper-based catalysts tends to be both pyrophoric and particularly temperature sensitive due to sintering concerns. More generally, the catalyst material may include any material capable of catalyzing the reaction of CO, e.g., via the water-gas shift reaction. In other embodiments, the invention can include catalysts for other reactions, and can include other particulate materials in general that would benefit from the temperature quenching effect of being coupled with a desiccant component.

In the case of the copper-based LTS catalyst, the catalyst is generally provided with a support material. In general, the support material is formed of any material on which the catalyst material and the catalyst species can be disposed. The support material can also provide the catalyst material with enhanced mechanical strength. Typically, the support material is formed of a material that is inert to the conditions inside anode gas supply 40. Examples of support materials include aluminum oxide, silicon oxide, zinc oxide, zirconium oxide, and ceria, although numerous other materials can be used. Preferably, the catalyst material includes about 0 to about 60 weight percent, and more preferably, about 5 to about 15 weight percent, of the support material. Other percentages are possible. As known in the art, the preferred weight percentage may depend in part on whether a precious metal or a base metal (e.g., a non-precious metal) is used.

The catalyst species is preferably finely disposed on the support material. Generally, as described above, distributing the catalyst species on the support material preserves the activity of the catalyst material per unit volume, while reducing the risk of decreasing the catalytic efficiency of the catalyst material due to heat developed during activation of the catalyst material. The catalyst species can be distributed or loaded on the support material by a number of methods, such as, for example, impregnating the support material with an organometallic material containing the catalyst species, e.g., copper citrate, drying and calcining the support material. Preferably, the catalyst species is loaded on the support material between about 5 and 60 weight percent, and more preferably, between about 10 to about 20 weight percent.

In certain embodiments, the catalyst material can further include a binder, which enhances the mechanical properties of the catalyst material. Examples of binders include carbon, graphite, zinc oxide, zirconium oxide, and iron oxide. Some binders, such as zinc oxide, can provide good dispersion of the catalyst material, can help to stabilize the catalyst material, and/or can act as a filter of impurities, such as sulfur, that may be present in the anode gas stream. Preferably, the catalyst material includes about 20 to about 50 weight percent, and more preferably, about 20 to about 30 weight percent, of the binder.

Examples of catalyst materials include $Au/ZnO$, $Au/ZrO_2$, $Au/Fe_2O_3$, $Au/Fe_2O_3/ZnO$, $Au/Fe_2O_3/ZrO_2$, and $CuO/ZnO/Al_2O_3$. Some catalyst materials are available commercially, for example, from Haldor Topsøe (Lyngby, Denmark).

The desiccant is formed of any material capable of sorbing and desorbing water. Preferably, the desiccant is a low-density, porous material that desorbs water endothermically, i.e., when heat is applied to the desiccant. More preferably, the desiccant can sorb and desorb water at a capacity and rate as good as that of a zeolite, for example, adsorbing at least about 10 weight percent of water at an activation temperature of about 200° C. Other examples of desiccants include amorphous silicon oxides, amorphous aluminum oxides, and clays.

The desiccant is combined with the catalyst material such that there is enough desiccant to desorb water to substantially quench the temperature of the catalyst material when the catalyst material is exposed to exothermic oxidizing or reducing conditions. However, too much desiccant and too little catalyst material in LTS catalyst 130 can decrease the catalytic effectiveness of the LTS catalyst. For example, the desiccant is combined with the catalyst material in a weight ratio of catalyst to desiccant that can range from about 1:1 to about 1:10. Other ratios are possible and may be selected and optimized, for example, according to economic and performance considerations commensurate with the materials used and the function provided.

As will be appreciated by those skilled in the art, LTS catalyst 130 can be formed in a number of ways, provided that water desorbed from the desiccant can quench the temperature of the catalyst when the LTS catalyst is exposed to exothermic oxidizing or reducing conditions. In some embodiments, the catalyst material and the desiccant can be ground, intimately mixed together, and pressed or extruded into pellets. The catalyst species or material can be applied directly to the desiccant. For example, zeolite pellets or extrusions can be impregnated with copper citrate by incipient wetness, dried, and calcined to form LTS catalyst 130. The catalyst species or material can also be applied as a coating on a monolith, a pellet, or an extrudate of desiccant. Other known methods of catalyst implementation may also be used.

In certain embodiments, LTS catalyst 130 can further include a reduction promoter. Because the catalyst material, e.g., CuO, is typically finely distributed on the support material, it may be difficult to activate or reduce the catalyst material at process temperatures of about 200° C. compared to activating, for example, bulk CuO. The reduction promoter may be formed of a material capable of sorbing a reducing agent, e.g., $H_2$, in the process gas and using the reducing agent to enhance reduction of the finely distributed catalyst material at reduced temperatures. Examples of reduction promoters include platinum and ruthenium, which can sorb hydrogen gas and convert diatomic hydrogen gas molecules to hydrogen atoms, which are reducing agents with relatively high activity. The reduction promoter can be added to LTS catalyst 130 similarly to how the catalyst material is applied to the desiccant, for example, the LTS catalyst can be impregnated with platinum nitrate, dried and calcined. Preferably, LTS catalyst 130 includes an amount of the reduction promoter, e.g., about 0.1 to about 1 weight percent, that does not produce a loss in efficiency because some reduction promoters, such as platinum, can undesirably promote reaction of CO with $H_2$ to produce $CH_4$, thereby reducing the capacity of anode gas supply 40 and fuel cell system 20.

In some embodiments, the performance of fuel cell system 20 can be enhanced by increasing the steam to carbon, e.g., $H_2O$ to $CH_4$, ratio in the anode gas stream. Adding more steam in the anode gas stream can increase the amount of water that sorbs to the desiccant, and therefore, more water can desorb when needed to quench the temperature of the catalyst material. Furthermore, without wishing to be bound to any theories, it is believed that increasing the steam to carbon ration also increases the activity of LTS catalyst 130 per unit volume. Because more water can sorb into the desiccant, which is in close contact with the catalyst material, increasing the steam to carbon ratio can effectively increase the amount of water that contacts the catalyst material. An increase in water that contacts LTS catalyst 130 can enhance the activity of the LTS catalyst by effectively shifting the water-gas shift reaction ($CO+H_2O \leftrightarrow H_2+CO_2$) to favor the production of hydrogen and carbon dioxide, thereby producing more desirable hydrogen and eliminating more undesirable CO. Referring back to FIG. 2, after the anode gas stream flows through LTS catalyst 130, the anode gas stream flows through preferential oxidizer (PROX) 140. PROX 140 is a platinum-based catalyst operating at about 100–200° C. to which oxygen (air) is added to reduce further the amount of CO in the anode gas stream before the stream enters fuel cell stack 30.

After the anode gas stream flows through PROX 140, the stream is cooled to a temperature range of about 70–90° C., e.g., by heat exchangers, and is thus fully saturated with water. The stream then flows to fuel cell stack 30 for the fuel cell gases to react to produce electrical energy.

Other embodiments of the invention are contemplated. For example, while the fuel cell systems described herein use hydrogen and oxygen as the fuel cell gases, the invention can be applied to other fuel cell systems using different fuel cell gases.

Figure 3:
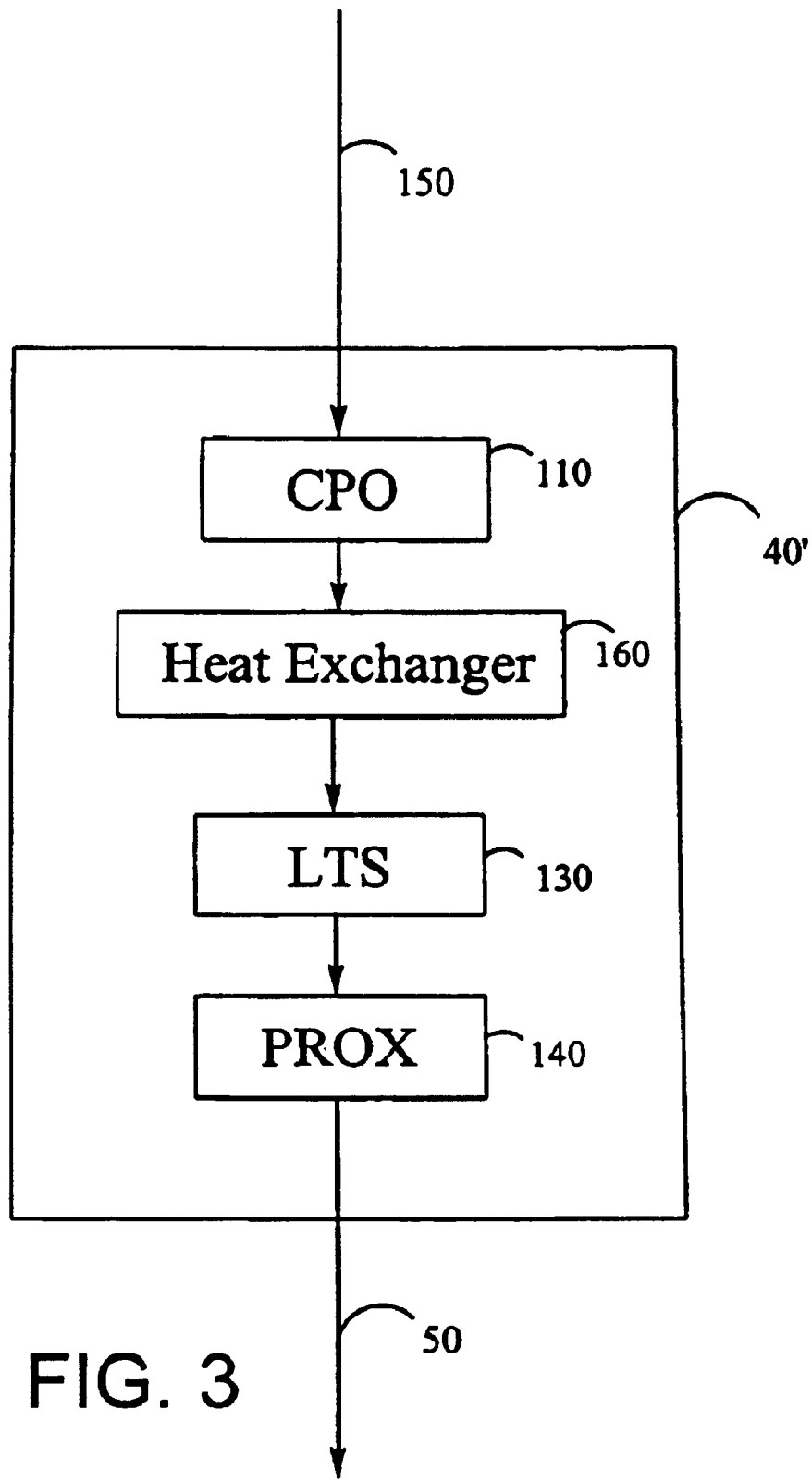
FIG. 3 is a schematic diagram of an embodiment of a fuel processor.

FIG. 3 shows another embodiment of anode gas supply 40' in which HTS catalysts are removed from the anode gas supply. After the anode gas stream flows through CPO 110, the anode gas stream is cooled by one or more heat exchangers 160, e.g., to an operating temperature of an LTS catalyst, and flows to LTS catalyst 130 for oxidizing CO. The anode gas stream then flows to PROX 140 and fuel cell stack 30 as described above.

In other embodiments, LTS catalyst 130 includes the catalyst material directly disposed on the desiccant, i.e., the catalyst material is not disposed on a support material.

Anode gas supply 40 and 40' can further include additional features, such as heat exchangers and steam generators, as described in commonly-owned Dutch Patent Application 1013478.

The following example is for illustrative purposes and not intended as limiting. It will be appreciated that the particular compositions, ratios and reaction conditions shown are for illustrative purposes, and can be optimized for various catalysts, reactions, and economic and performance considerations.

EXAMPLE

CuO/ZnO/Al2O3 catalyst pellets (LK821–2), available from Haldor Topsøe (Lyngby, Denmark), and a Type X, sodium form zeolite (Siliporite G5, 10 Å), available from Elf Atochem (Paris-La-Defense, France) are mixed in a 1:1 weight ratio and milled into to a powder in an oxygen-free atmosphere. The powder is thoroughly mixed and the sieve fraction up to 0.5 mm is placed in a pelletizer and formed into cylindrical pellets of about ⅛" diameter and ⅛" length.

Figure 4:
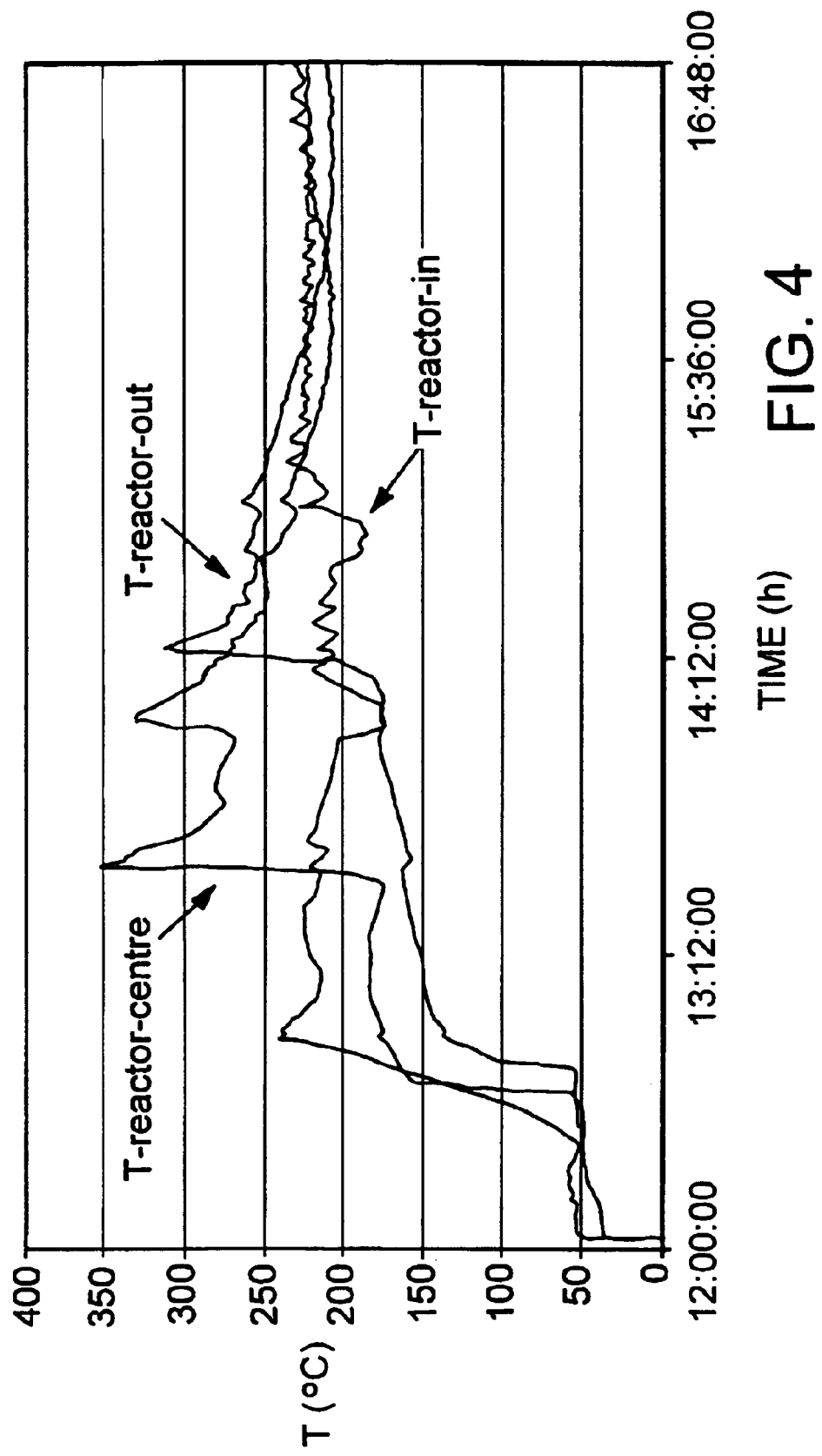
FIG. 4 is a temperature graph of an embodiment of a catalyst undergoing a reduction reaction.

FIG. 4 shows a temperature graph of an LTS reactor using such a catalyst arrangement as it is reduced with reformate. The reformate contains about 40% $H_2$ on a dry basis, and is flowed through the reactor at a rate of about 112 standard liters per minute (SLM) $H_2$. The curves in FIG. 4 show that the readings of thermocouples at the inlet to the bed, in the middle of the bed, and at the outlet of the bed. As shown in FIG. 4, the temperature of each thermocouple is kept below 350° C.

Figure 5:
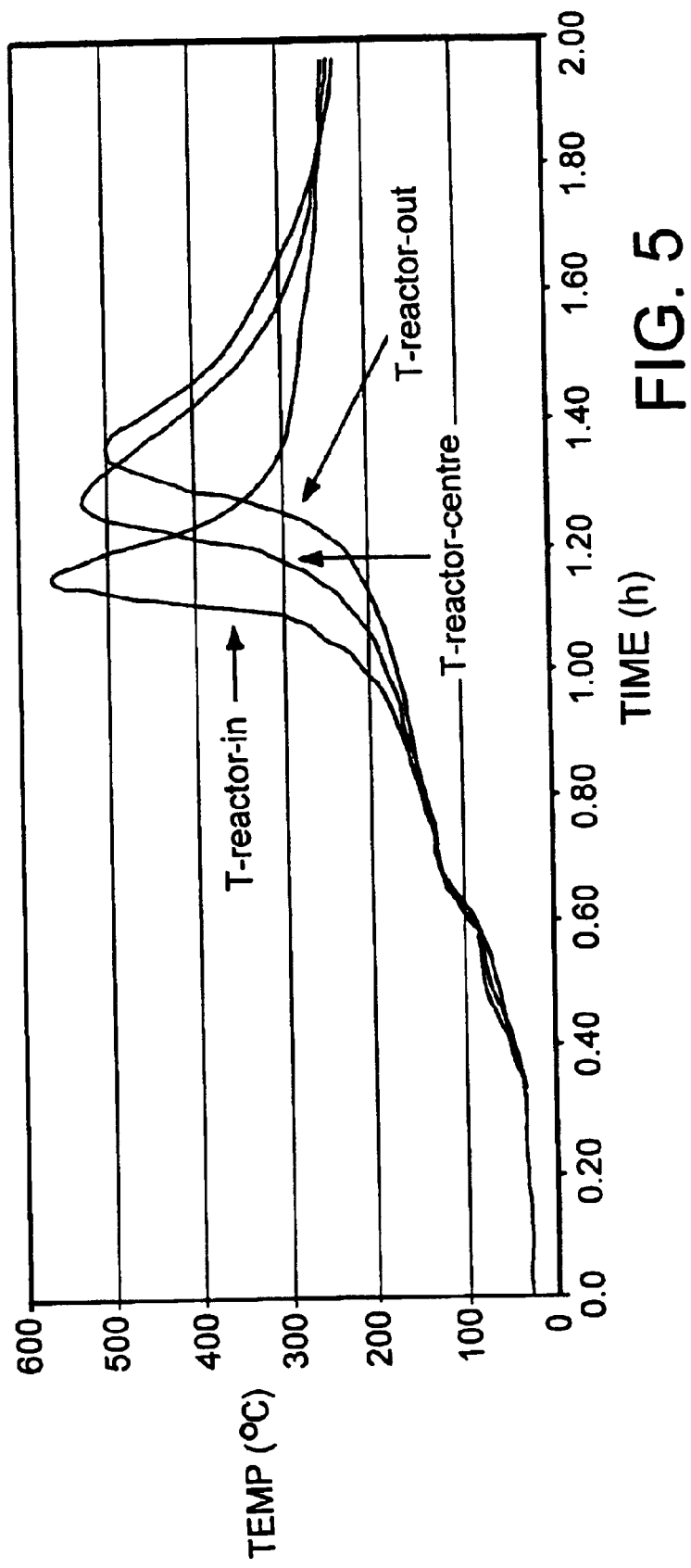
FIG. 5 is a temperature graph of an embodiment of a catalyst undergoing an oxidation reaction.

In contrast, FIG. 5 shows the same process as in FIG. 4, except that the CuO/ZnO/Al2O3 catalyst (Topsoe LK-821–2) is used in 4.5×3.4 mm pellets without the addition of the zeolite desiccant component. The curves show thermocouples at the inlet to the bed, in the middle of the bed, and at the outlet of the bed. As shown in FIG. 5, the temperature reaches well over 500° C.

Figure 6:
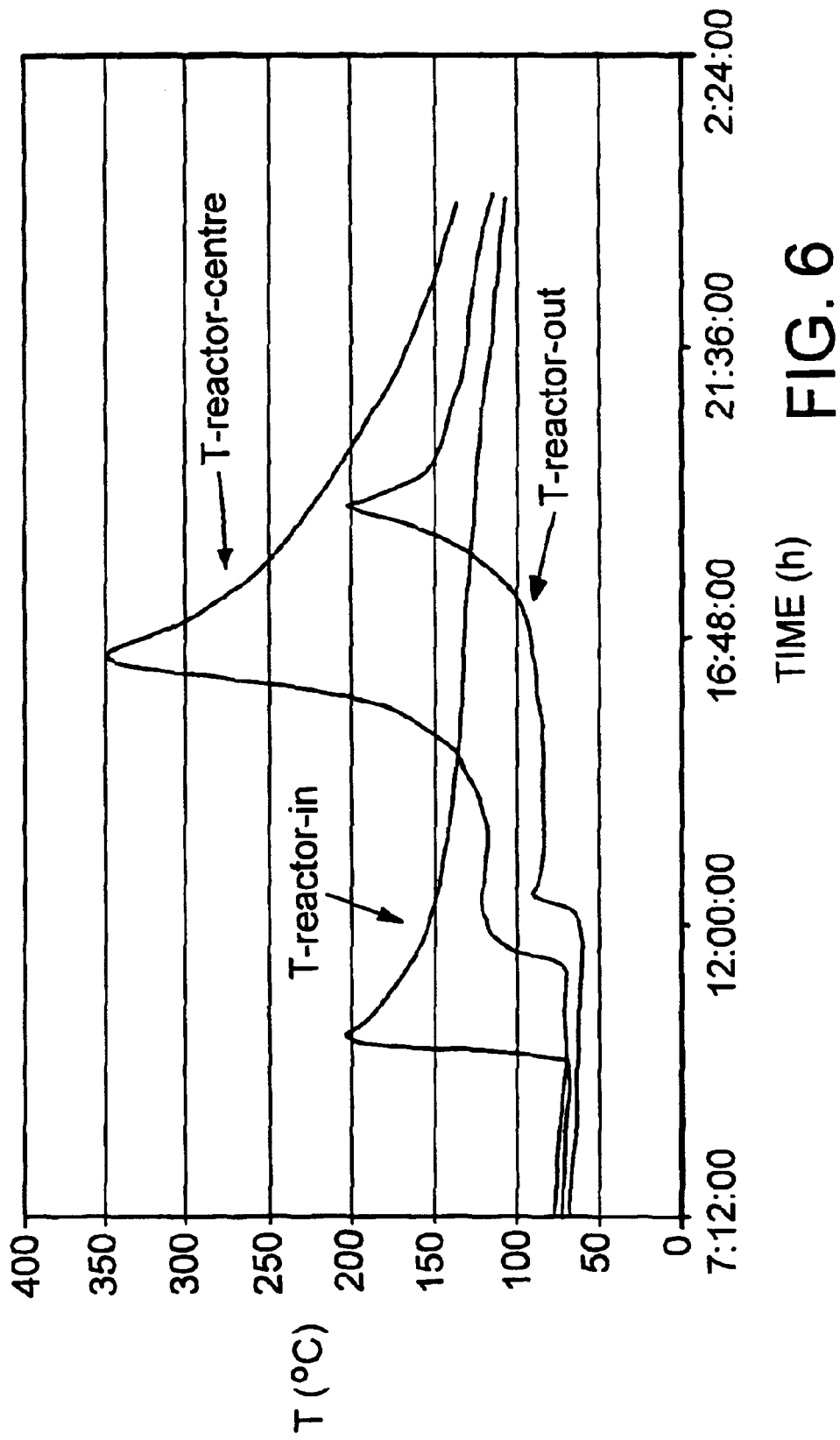
FIG. 6 is a temperature graph of an embodiment of a catalyst undergoing an oxidation reaction.

Finally, FIG. 6 shows a temperature graph of the LTS reactor in FIG. 4 as it is shut down, cooled to about 75° C., and then subject to about 4 L/min of air which oxidizes the catalyst. Again, the curves show thermocouples at the inlet to the bed, in the middle of the bed, and at the outlet of the bed. As shown in FIG. 5, the temperature remains under 350° C.

Other embodiments are within the claims.

What is claimed is:

1. An article, comprising:
    a fuel processor for a fuel cell system; and
    a catalyst composite in the fuel processor, the catalyst composite comprising:
        a first material capable of undergoing an exothermic reaction; and
        a second material capable of sorbing and desorbing water.

2. The article of claim 1, wherein the second material is present in an amount sufficient to sorb an amount of water sufficient to remove a portion of the heat generated when the first material undergoes an exothermic reaction.

3. The article of claim 2, wherein the first material is a fuel processor catalyst.

4. The article of claim 3, wherein the first material comprises a material selected from a group consisting of copper, nickel, iron, chromium, zinc, cobalt, platinum, palladium, rhodium, ruthenium, and iridium.

5. The article of claim 3, wherein the second material comprises a material selected from a group consisting of a zeolite, silicon oxide, aluminum oxide, and a clay.

6. The article of claim 3, wherein the first material is a CPO catalyst.

7. The article of claim 3, wherein the first material is capable of catalyzing oxidation of carbon monoxide.

8. The article of claim 3, wherein the first material is an HTS catalyst.

9. The article of claim 3, wherein the first material is an LTS catalyst.

10. The article of claim 9, wherein the first material comprises a component selected from a group consisting of copper, cupric oxide and cuprous oxide.

11. The article of claim 1, wherein, when the first material undergoes an exothermic reaction, water present on the second material desorbs from the second material.

12. The article of claim 11, wherein the first material is disposed on a third material.

13. The article of claim 12, wherein the third material comprises a material selected from a group consisting of aluminum oxide, zinc oxide, zirconium oxide, and iron oxide.

14. The article of claim 12, wherein the catalytic composite further comprises a fourth material selected from a group consisting of zinc oxide, zirconium oxide, and iron oxide.

15. The article of claim 1, wherein the second material is a desiccant.

16. The article of claim 15, wherein the second material comprises a material selected from a group consisting of a zeolite, silicon oxide, aluminum oxide, and a clay.

17. The article of claim 1, wherein the first and second materials are formed into granules.

18. The article of claim 1, wherein the first material is coated on the second material.

19. The article of claim 1, wherein the first material has a reduced state and an oxidized state, and the second material is present in an amount sufficient to prevent the composite from sintering when the first material is in the reduced state and is exposed to air.

20. The article of claim 1, wherein the first material has a reduced state, an oxidized state, and a sintering temperature, and the second material is present in an amount sufficient to prevent the composite from reaching the sintering temperature when the first material has a starting temperature of less than 100° C. and is in the reduced state and is exposed to a flow of 4 liters per minute of air.

21. The article of claim 1, wherein the first material has a reduced state, an oxidized state and a sintering temperature, and the second material is present in an amount sufficient to prevent the composite from reaching the sintering temperature when the first material has a starting temperature of less than 100° C. and is in the oxidized state and is exposed to a flow of 100 standard liters per minute of hydrogen.

* * * * *

UNITED STATES PATENT AND TRADEMARK OFFICE
CERTIFICATE OF CORRECTION

PATENT NO. : 6,784,135 B2
DATED : August 31, 2004
INVENTOR(S) : Anton Scholten et al.

It is certified that error appears in the above-identified patent and that said Letters Patent is hereby corrected as shown below:

Title page,
Item [73], Assignee, "Power Plug, Inc." should read -- Plug Power, Inc. --

Signed and Sealed this

Twenty-first Day of December, 2004

JON W. DUDAS
*Director of the United States Patent and Trademark Office*